Patented July 7, 1936

2,046,423

UNITED STATES PATENT OFFICE 2,046,423

HIGHLY CONDENSED HETEROCYCLICALLY BOUND ANTHRAQUINONE DERIVATIVES CONTAINING NITROGEN AND PROCESS OF MAKING SAME

Wilhelm Moser, Riehen, near Basel, and Walter Fioroni, Binningen, near Basel, Switzerland, assignors to firm of Society of Chemical Industry in Basle, Basel, Switzerland No Drawing. Application February 25, 1935, Serial No. 8,217. In Switzerland February 27, 1934

6 Claims. (Cl. 260—40)

The present process relates to the manufacture of highly condensed heterocyclically bound anthraquinone derivatives containing nitrogen which are valuable vat-dyestuffs. It comprises the process of making these dyestuffs, as well as the new products themselves.

It has been found that the compounds of the general formula

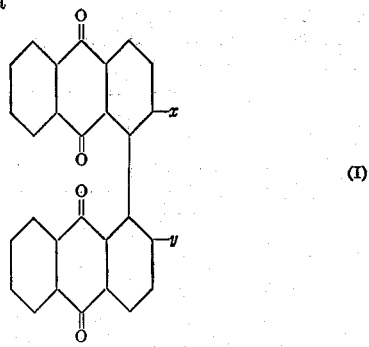

(I)

in which $x$ represents $NH_2$ or an acidylamino-group, and $y$ a hydrogen atom or a $CH_3$-group, are valuable intermediate products for the manufacture of new vat-dyestuffs, which are themselves characterized by the atomic skeleton

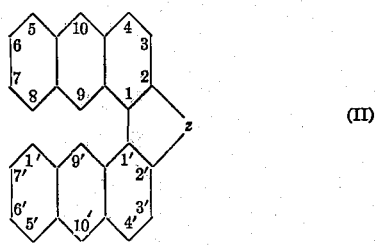

(II)

in which the carbon atoms in the 9:9' positions or 9:9' and 8:8' positions can be directly connected, and in which $z$ stands for an NH-group or an

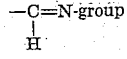

The new dyestuffs are obtained from the parent material of the Formula I by treating this material in different phases with condensing agents having different effects, the condensation which causes formation of the heterocyclic ring between the positions 2 and 2' being quite generally carried out either in the parent material or after any of the condensation which effect the connection of the carbon atoms in the 9:9' and 8:8' positions.

The products in which the heterocyclic condensation is carried out merely between the carbon atoms 2 and 2' correspond to the general formula

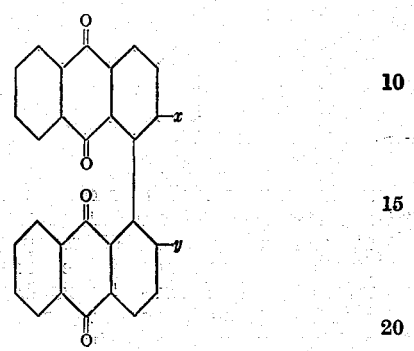

in which $x$ stands for an $NH_2$-group or an acidylamino-group, and $y$ stands for H. The heterocyclic ring closure leads to products which belong to the 2:2'-dianthrimide-1:1'-carbazole series and therefore correspond to the general formula

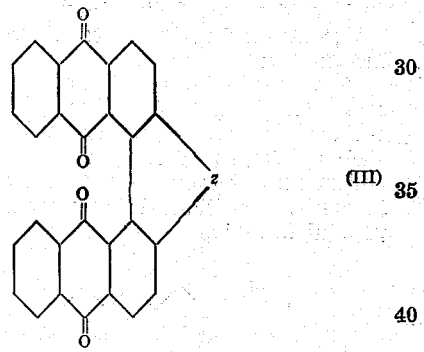

(III)

in which $z$ stands for an NH-group. The condensation leading to this ring closure is advantageously carried out by treating the parent material with salt-like condensation products, such as, for example aluminium chloride or aluminium bromide with addition of sodium chloride or ferric chloride, or also with condensing agents having an alkaline action, such as caustic alkali, most advantageously in the form of alcoholic caustic alkali. The dyestuffs of the dianthrimide-carbazole series are dark powders dissolving in sulfuric acid with characteristic fluorescence, and dyeing cotton from the vat olive tints.

If the parent materials of the general Formula I or of the general Formula III are treated with sulfuric acid in the presence of suitable reducing agents, preferably finely divided metals, such as, for example, very pure finely divided copper or finely divided aluminium, condensation takes place between the 9:9'-carbon atoms with formation of products of the general formula

(IV)

and

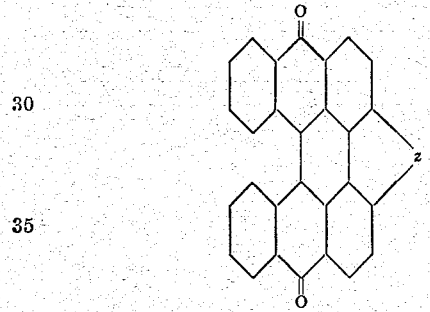

(V)

in which $x$ stands for an $NH_2$-group or an acidyl-amino-group, $y$ for a $CH_3$-group or a hydrogen atom, and $z$ for an NH-group or a —CH—N-group. The product of the general Formula V may also be obtained by causing salt-like condensing agents or condensing agents having an alkaline action to react in the manner described with the product of the Formula IV. The products of the general Formula V are therefore 2:2'-iminomesobenzdianthrones, or compounds of the phenantridine series which may be described for example as allopyridinomesobenzdianthrones. They are valuable vat-dyestuffs dissolving in sulfuric acid to a solution having a characteristic coloration, and dyeing cotton from the vat red to brown tints.

Now, the products of the general Formulas IV and V are converted by further treatment with sulfuric acid, in the presence of oxidizing agents, such as, for example manganese dioxide or bichromate, by direct linkage of the carbon atoms in the 8:8' positions, into new compounds of the general formulas

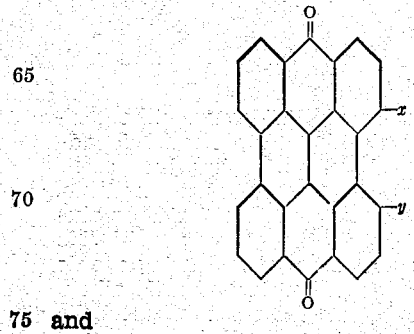

(VI)

and

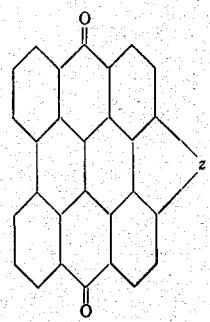

(VII)

in which $x$, $y$ and $z$ have the meaning indicated above.

The products of the general Formula VII may also be obtained by treating the products of the general Formula VI in known manner with condensing agents which are salt-like or have an alkaline action. The products of the general Formula VII are imino-meso-naphthodianthrones or allopyridino-meso-naphthodianthrones. They also dissolve in sulfuric acid to a solution having a characteristic coloration and a red fluorescence, and produce orange to brown tints from the vat.

All the products of the general Formulas III, V and VII may be converted into vat-dyestuffs which are still more valuable by treating them with halogenating agents, i. e. by chlorinating, brominating or iodizing. Particularly valuable effects are obtained by chlorinating the dyestuffs of the general Formula VII. Among the new products those are particularly valuable in which $z$ stands for the

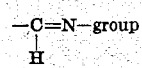

The following examples illustrate the invention, without however limiting the same, the parts being by weight:—

*Example 1*

Into a mixture of 100 parts of aluminium chloride and 20 parts of dry common salt, at 150° C., there are introduced 5 parts of 2-amino-1:1'-di anthraquinonyl of the formula

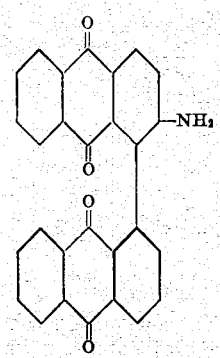

which may be obtained by treating with a dehalogenating agent a mixture, in approximately molecular proportions, of a 1-halogen-2-acyl-aminoanthraquinone and a 1-halogenanthraquinone, and then saponifying the product thus obtained. The mixture is kept at a temperature of 150–160° C. for 2 hours, and then poured upon ice. Concentrated hydrochloric acid is then added and the whole is boiled and filtered and the solid matter washed with water until neutral.

This product, probably 2:2'-dianthrimide-1:1'-carbazole of the formula

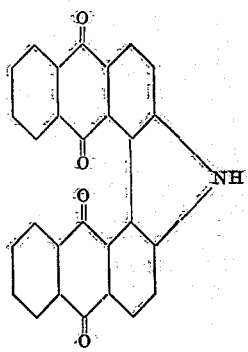

is a dark brown body, soluble in sulfuric acid to a brown-red fluorescing solution. The vat is brown-red; it dyes cotton olive tints.

Example 2

Into 500 parts of sulfuric acid at a low temperature 50 parts of 2-phthalimino-1:1'-dianthraquinonyl (obtainable by treating with a dehalogenating agent a mixture, in approximately molecular proportions, of a 1-halogen-2-phthaliminoanthraquinone and a 1-halogenanthraquinone) and 38 parts of very pure finely divided copper are introduced. The mixture is stirred for 24 hours at a non-saponifying temperature and the copper is then separated by filtration. To work up the product the mass is poured into ice-water, boiled, filtered, washed with hot water until neutral and dried. The 2-phthalimino-meso-benzdianthrone of the formula

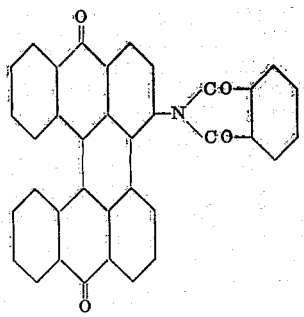

obtained in this manner is purified by extraction with glacial acetic acid, when it becomes a bright brown body, yielding a green solution in sulfuric acid. In the same manner 2-phthalimino-2'-methyl-meso-benzdianthrone of the formula

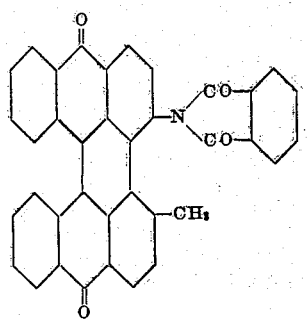

may be made from 2-phthalimino-2'-methyl-1:1'-dianthraquinonyl; also the 2:2'-diphthalimino-meso-benzdianthrone from the 2:2'-diphthalimino-1:1'-dianthraquinonyl.

Example 3

Into a mixture of 150 parts of pyridine and 5 parts of hydrazine hydrate are introduced 10 parts of 2-phthalimino-meso-benzdianthrone (compare the preceding example) and the mixture is stirred for 4 hours at 25-30° C. After diluting with water to produce a solution containing 30 per cent of pyridine, the mass is filtered, the solid matter washed with hot water until free from pyridine and dried. The 2-amino-meso-benzdianthrone of the formula

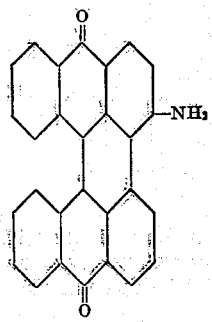

thus obtained forms dark red-brown crystals soluble in sulfuric acid to a pure green solution. The vat is green.

In like manner there is obtained the 2-amino-2'-methyl-meso-benzdianthrone of the formula

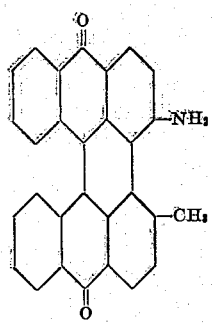

from the corresponding phthalimino-compound; this product dissolves in sulfuric acid to a pure green solution and yields a bluish-green vat. From the 2:2'-diphthalimino-meso-benzdianthrone there is obtained the 2:2'-diamino-meso-benzdianthrone, which forms dark violet crystals soluble in sulfuric acid to a pure bluish-green solution and yielding a bluish-green vat.

Example 4

Into a mass of 120 parts of potassium hydroxide and 120 parts by volume of absolute alcohol heated to 140° C. there are introduced at 140-150° C., 20 parts of 2-amino-meso-benzdianthrone (compare Example 3). After 1 hour at 150-160° C. the mass is mixed with water and worked up in the usual manner. The carbazole thus obtained which is apparently 2:2'-imino-meso-benzdianthrone of the formula

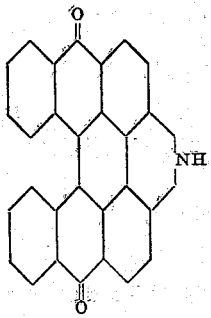

is a brown-red body which dissolves in sulfuric acid to a pure green solution and dyes cotton in a bluish-green vat red-brown tints.

In like manner there is obtained from 2-amino-2'-methyl-meso-benzdianthrone (compare Example 3) a phenanthridine, namely the allo-pyridino-meso-benzdianthrone of the formula

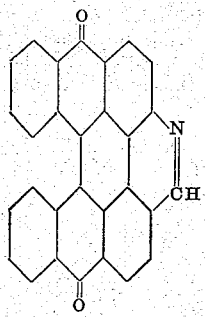

This is a brown-red body which dissolves in sulfuric acid to a yellow-green solution and dyes cotton in a reddish-blue vat salmon red tints.

*Example 5*

Into 500 parts of concentrated sulfuric acid there are introduced at ordinary temperature 10 parts of 2-phthalimino-meso-benzdianthrone (compare Example 2) and then 10 parts of manganese dioxide, and the whole is stirred for 2 hours at the ordinary temperature, drained on a stone, filtered and transferred to ice. After boiling and filtering the solid matter is washed with hot water until neutral and dried. This 2-phthalimino-meso-naphthodianthrone of the formula

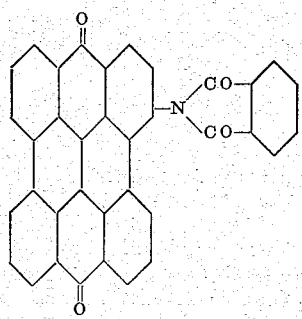

is a brown yellow body, soluble in sulfuric acid to a pure red, fluorescing solution.

From 2-phthalimino-2'-methyl-meso-benzdianthrone there may be obtained the 2-phthalimino-2'-methyl-meso-naphthodianthrone, a yellow body which dissolves in sulfuric acid to a red fluorescing solution.

The 2:2'-iminomesobenzdianthrone yields under similar conditions the 2:2'-imino-meso-naphthodianthrone of the formula

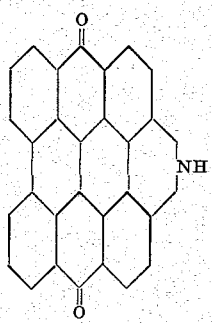

a red-brown body which dissolves in sulfuric acid to a solution which fluoresces bluish-red. The vat is pure green.

When the 2'-phthalimino-meso-naphthodianthrone or the 2-phthalimino-2'-methyl-meso-naphthodianthrone is saponified by the prescription given in Example 3, there is obtained the corresponding 2-amino-compounds which dissolve to pure red fluorescing solutions in sulfuric acid.

The 2-amino-2'-methyl-meso-naphthodianthrone yields when condensed in accordance with the prescription of Example 4 a phenanthridine-derivative, the allo-pyridino-meso-naphtho-dianthrone of the formula

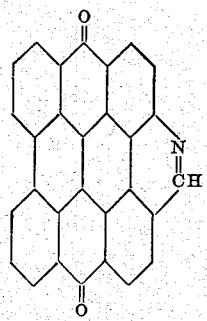

This is a brown body which dissolves in sulfuric acid to a blue-violet solution and dyes vegetable fibre in a violet vat fast orange tints.

*Example 6*

Into 60 parts of nitrobenzene are introduced 5 parts of allo-pyridino-meso-benzdianthrone (made as described in Example 4). This suspension is heated to 115° C. and into it are added by drops 15 parts of sulfuryl chloride in the course of 2 hours, the temperature being 115–120° C. After cooling and filtering, the filtrate is distilled with steam. The residue of the distillation, presumably a trichloro-derivative, is a dark red-brown, crystalline powder which dyes cotton in a grey-blue vat Bordeaux red tints and dissolves in sulfuric acid to an olive-green solution.

The bromination of this product in chlorosulfonic acid yields, when sufficient bromine is used, a tribromo-derivative that dyes cotton red-brown.

The product of the first paragraph of this example, when oxidized by the prescription given in Example 5, yields a trichlorinated alloy-pyridino-meso-naphthodianthrone which is a brown body, dyeing cotton in a blue-black vat yellow brown tints. The sulfuric acid solution is pure blue.

*Example 7*

Into a mixture, at 150° C., of 100 parts of aluminium chloride and 20 parts of dried common salt, there are introduced 5 parts of 2-amino-meso-benzdianthrone (compare Example 3). The mixture is maintained for 2 hours at 150–160° C., then transferred to ice, whereupon concentrated hydrochloric acid is added, the whole is boiled and then filtered, and the solid matter washed neutral. The product, apparently the 2:2'-imino-meso-naphthodianthrone, is red-brown and dissolves in sulfuric acid to a solution which fluoresces bluish-red. The vat is pure yellow green.

*Example 8*

0.4 kilo of the dyestuff named in the last paragraph of Example 6 is suspended in 0.2 litre of Turkey red oil (1:10) and 40 litres of water at 50° C.; there are added 2 litres of caustic soda solution of 36° Bé. and 1 kilo of hydrosulfite conc. powder is strewn in, while stirring. After 10-15 minutes the dyestuff is vatted, the solution is added to a bath which contains 320 litres of water at 50° C., 0.4 litre of caustic soda solution of 36° Bé. and 0.1 kilo of hydrosulfite conc. powder. 20 kilos of well wetted cotton are now introduced and dyeing is continued for ¾ hour at 40-50° C. After 10 minutes further dyeing, 40 litres of common salt solution (of 20 per cent. strength) are added. When dyeing is complete, the goods are wrung out, suspended in the air for oxidation, rinsed and soaped as usual.

What we claim is:—

1. In the manufacture of highly condensed anthraquinone derivatives, the step which consists in treating compounds of the general formula

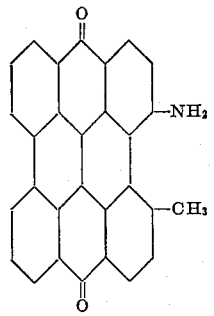

with aluminium chloride.

2. In the manufacture of highly condensed anthraquinone derivatives, the step which consists in treating compounds of the general formula

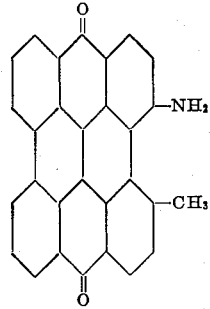

with aluminium chloride in the presence of sodium chloride.

3. The halogenated highly condensed heterocyclically bound anthraquinone derivatives containing nitrogen which are characterized by the atomic skeleton

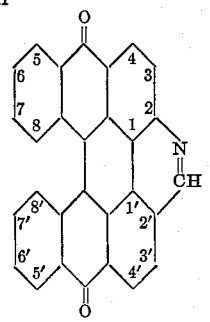

which products are dark powders dissolving in sulfuric acid to olive-green to pure blue solutions having a yellow-red fluorescence, and dyeing cotton from a grey-blue to blue-black hydrosulfite vat fast Bordeaux to yellow-brown tints.

4. Process for the manufacture of highly condensed heterocyclically bound anthraquinone derivatives containing nitrogen, consisting in causing sulfuric acid in the presence of finely divided copper, and sulfuric acid in the presence of manganese dioxide and a chlorinating agent to react consecutively with the products of the formula

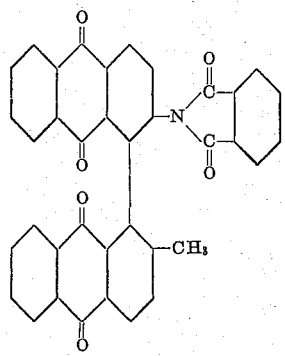

and treating the products, prior to one of the two last steps, with aluminium chloride.

5. The halogenated highly condensed heterocyclically bound anthraquinone derivative containing nitrogen which corresponds to the formula

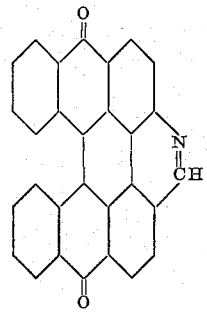

which product is a dark red-brown powder dissolving in sulfuric acid to an olive-green solution having a yellow-red fluorescence and dyeing cotton from a grey-blue hydrosulfite vat fast Bordeaux-red tints.

6. The halogenated highly condensed heterocyclically bound anthraquinone derivative containing nitrogen which corresponds to the formula

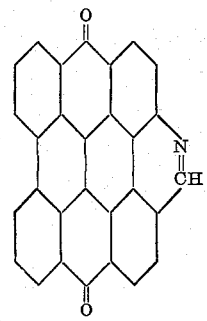

which product is a brown powder dissolving in sulfuric acid to a pure blue solution having a yellow-red fluorescence and dyeing cotton from a blue-black hydrosulfite vat fast yellow-brown tints.

WILHELM MOSER.
WALTER FIORONI.